J. SPAHN.
SNOW PLOW.
APPLICATION FILED AUG. 25, 1910.
1,006,307.
Patented Oct. 17, 1911.
3 SHEETS—SHEET 2.
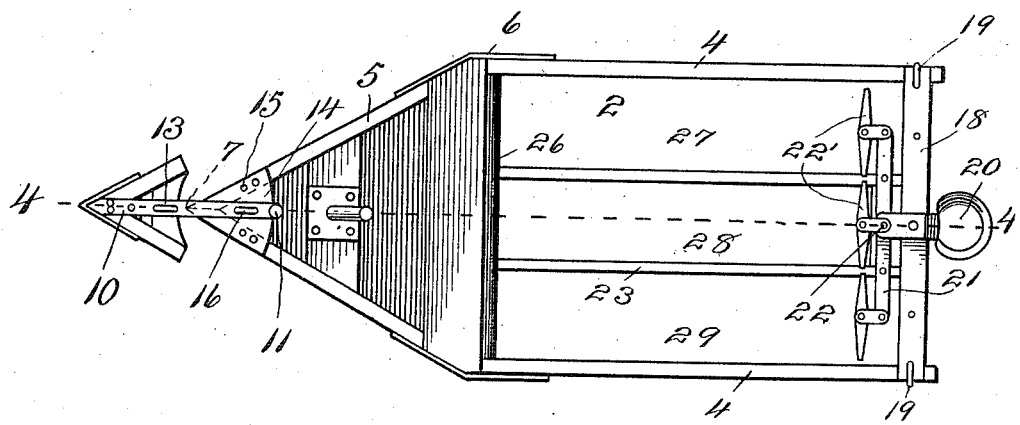
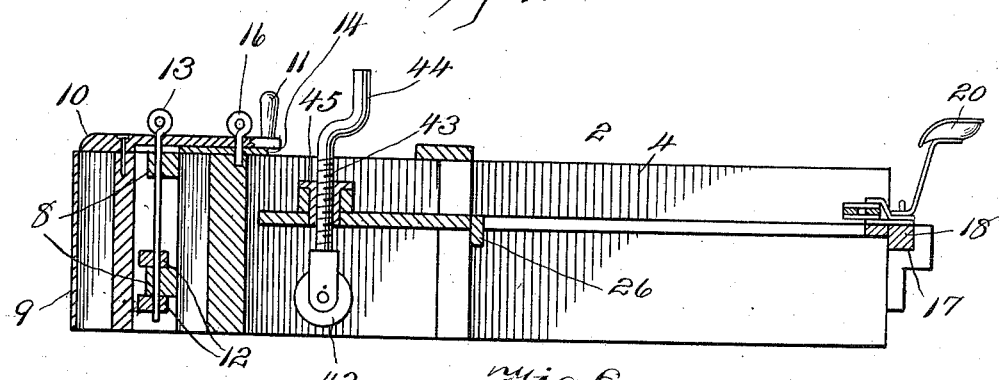
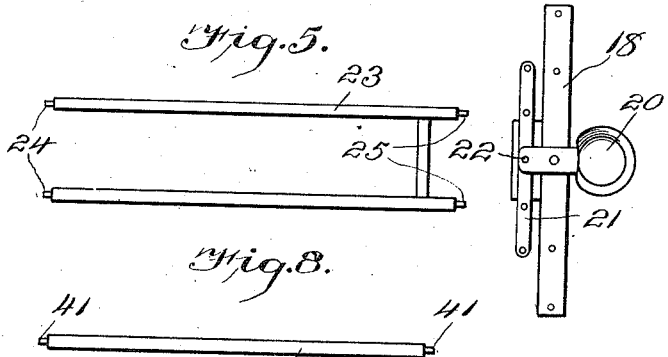
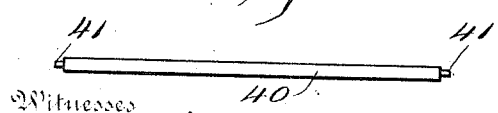
Witnesses
T. P. Britt
E. C. Duffy
Inventor
John Spahn
By
Attorneys

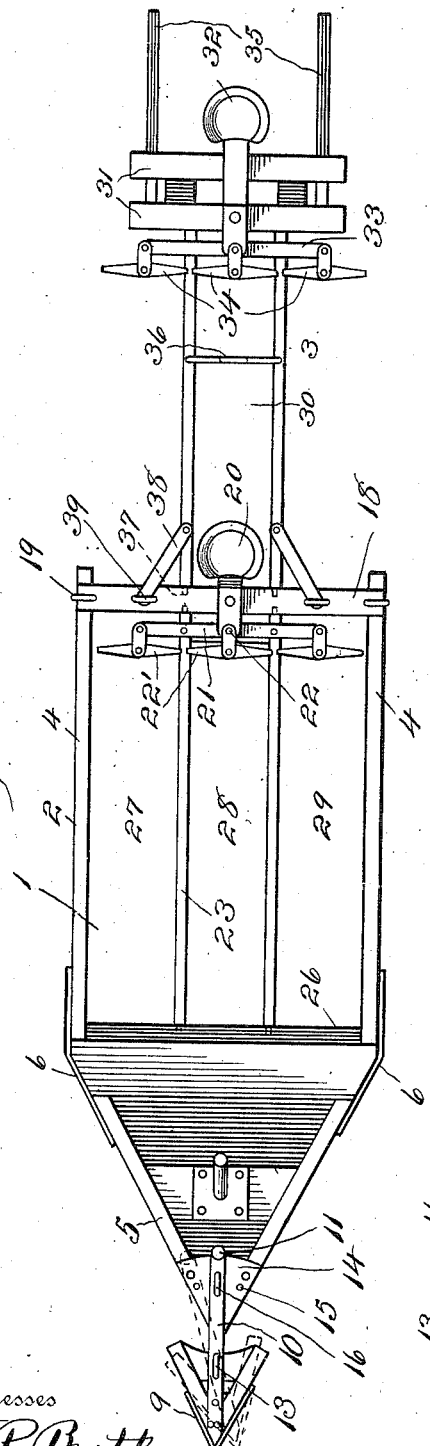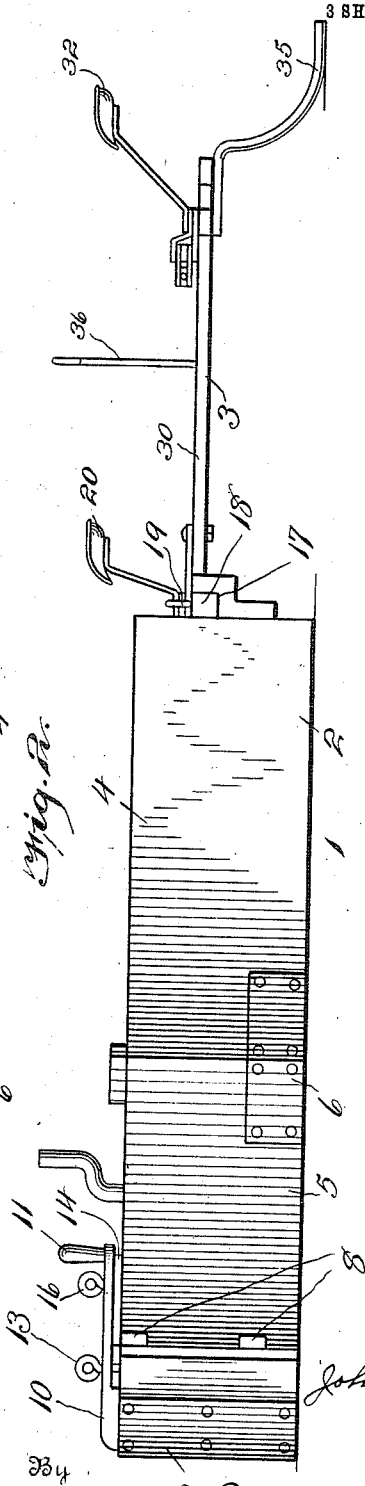

J. SPAHN.
SNOW PLOW.
APPLICATION FILED AUG. 25, 1910.

1,006,307.

Patented Oct. 17, 1911.

3 SHEETS—SHEET 3.

Witnesses
T. P. Britt
E. C. Duffy

Inventor
John Spahn
By
Attorneys

UNITED STATES PATENT OFFICE.

JOHN SPAHN, OF WILMINGTON, DELAWARE.

SNOW-PLOW.

1,006,307. Specification of Letters Patent. Patented Oct. 17, 1911.

Application filed August 25, 1910. Serial No. 578,868.

*To all whom it may concern:*

Be it known that I, JOHN SPAHN, a citizen of the United States, residing at Wilmington, in the county of Newcastle and State of Delaware, have invented certain new and useful Improvements in Snow-Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to snow plows and has for its object to provide a device of this class which is so arranged and constructed that the horses dragging the plow are entirely protected from the snow and drifts and can secure a good free footing for the work, to such an extent that they are not hampered and can exert their full power for forcing the plow through the snow or drifts to clean streets, highways and the like in a minimum length of time and without loss of effort.

With this object in view the invention consists in the novel construction of the plow and particularly in the novel arrangement for accommodating the teams for dragging the plow.

The invention also consists in certain other novel features of construction and in combinations of parts all of which will be fully described and afterward specifically pointed out in the appended claims.

Figure 9:
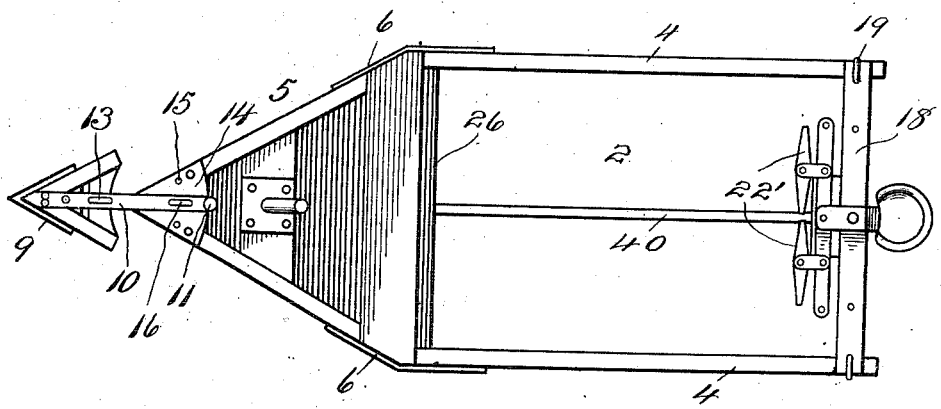
Figure 10:
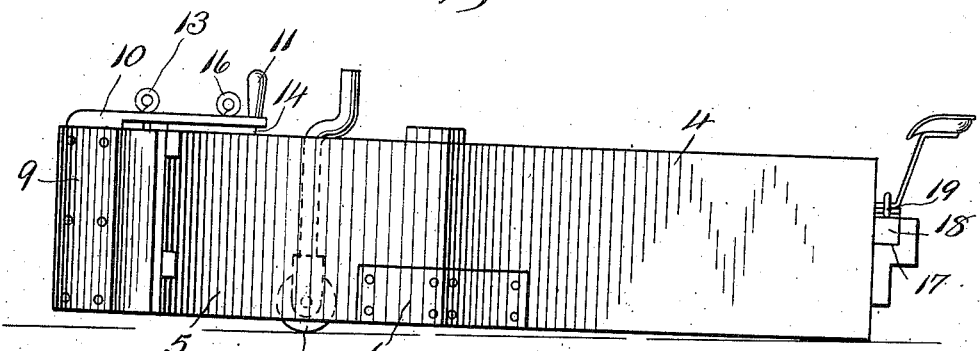
Figure 11:
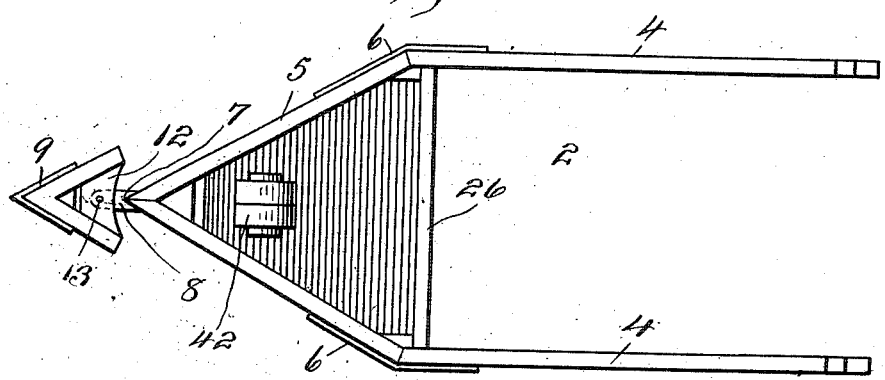

Referring to the accompanying drawings: Figure 1 is a plan view of a snow plow constructed in accordance with my invention. Fig. 2 is a side elevation of the same. Fig. 3 is a top plan view of the plow showing the arrangement for the following horses detached from the body of the plow. Fig. 4 is a vertical longitudinal sectional view taken on line 4—4 of Fig. 2. Fig. 5 is a detail plan view of the removable shafts arranged within the plow. Fig. 6 is a detail plan view of the removable cross piece and double-tree to which the removable shafts are secured at their rear ends. Fig. 7 is a front elevation of the removable rear section of the plow. Fig. 8 is a plan view of the removable pole arranged within the front section. Fig. 9 is a plan view of the plow illustrating the removable pole in position therein. Fig. 10 is a side elevation illustrating the forward roller in engagement with the surface of the ground, and Fig. 11 is a bottom plan view of the body of the plow.

Like numerals of reference indicate the same parts throughout the several figures in which—

1 indicates the plow which comprises the forward or body portion 2 and the rear removable portion 3. The forward portion 2 comprises the substantially parallel sides 4 and the pointed or tapered forward end 5, said forward end 5 being constructed of heavy material and preferably braced to the sides 4 by the metal plate 6 in order to securely strengthen the same.

Referring now to Figs. 1 and 4 it will be seen that the extreme point 7 of the plow is provided with preferably two lugs or projections 8 to which is pivoted the guiding point or rudder 9, said guiding point or rudder 9 being pointed or tapered as shown and is provided with a lever arm 10 and a handle 11 on said arm by means of which the guiding point or rudder 9 is swung from one side to the other as illustrated in dotted lines in Fig. 1. Said guiding point or rudder 9 is provided with two lugs or projections 12 which straddle the lower lug or projection 8 on the point 7 of the plow, and said lugs or projections 12 and the two lugs or projections 8 and the lever arm 10 of the guiding point or rudder 9 are provided with perforations through which a pin 13 passes as shown in Fig. 4. In order to pivot the guiding point or rudder 9 to the plow, and as will appear from Fig. 1 a plate 14 is provided at the point 7 of the plow, and said plate is provided with a series of perforations 15 into which a pin 16 carried on the guiding arm or lever 10 is inserted in order to maintain and rigidly hold the guiding point or rudder 9 either in a central position as shown in full lines in Fig. 1 or in a turned position as shown in dotted lines in Fig. 1.

As will appear from Fig. 4 the vertical sides 2 are provided at their rear ends with a depression 17 to receive the rear cross piece 18 (Fig. 6) which is removably secured in the depressions 17 by means of pins 19 (Fig. 3) or by any other suitable securing means, and as will appear from the drawings a seat 20 is mounted on said cross piece 18 and the double tree 21 is pivoted at 22' to the cross piece 18.

When employing three horses to the plow the double-tree is provided with three swingle-trees 22' as shown in Figs. 1 and 3 and the removable shafts 23 (Fig. 5) are arranged in the plow in the following manner: As will appear from Fig. 5 the forward ends of the shafts 23 are provided with pins 24 and the rear ends of the shafts 23 are provided with pins 25 the forward pins 24 of the shafts 23 entering recesses in the forward cross piece 26 (Fig. 1), while the rear pins 25 enter recesses in the rear cross piece 18 as shown in dotted lines in Fig. 1. When the shafts are thus inserted into the forward and rear cross pieces 26 and 18 the cross piece 18 is set down into the depressions 17 (Fig. 11) and secured by the pins 19 which provides a strong rigid construction and the three horses are accommodated in the spaces 27, 28 and 29 as shown in Figs. 1 and 3.

In exceptionally heavy drifts where three horses are not capable of dragging the plow I provide a rear attachment 3 as shown in Figs. 1, 2 and 7, said rear attachment 3 comprising the shafts 30 and the two cross pieces 31 on which the seat 32 is mounted and to which the double-tree 33 is pivoted, said double-tree 33 having three swingle-trees 34 mounted thereon as shown in Fig. 1, while two sleigh runners 35 are mounted under the cross pieces 31 as clearly shown in Fig. 2. Mounted on the shafts 30 is a yoke 36 under which the central horse of the rear section 3 is placed. By means of this construction six horses can be attached to the plow, and as all of the horses are behind the forward pointed or tapered portion 5 of the plow the snow is removed out of the path of the horses in such manner that they are enabled to secure a good firm and substantial footing.

In order to attach the rear portion 3 to the body of the plow the rear shafts 30 are provided on their forward ends with pins 37 which enter recesses in the cross piece 18 of the forward plow section as shown in Fig. 1; while I provide straps or braces 38 which pass from the shafts 30 to the cross piece 18 and are pinned thereto by means of pins 39 or by any other suitable securing means.

As will appear from Fig. 9 the plow can be quickly adjusted or altered to accommodate a team of two horses, and in order to accomplish this I remove the forward shafts 23 and substitute therefor the pole 40 (Fig. 8) which is provided at each end with a pin 41 which pins enter perforations in the forward cross piece 26 and in the rear cross piece 18. In this instance I remove one of the swingle-trees 22' and secure the two swingle-trees 22' (Fig. 9) in position shown in said figure to accommodate two horses within the vertical side piece 4.

When it is necessary to transport the plow from place to place and to raise the same clear of the ground a roller 42 (Figs. 4 and 10) is employed, said roller 42 being mounted on a threaded vertical shaft 43 on which a crank 44 is provided, said threaded shaft 43 operating in a threaded boxing 45 in such manner that the roller 42 can be turned or threaded down into position shown in Fig. 10 to engage the surface of the ground to raise the plow, and the roller 42 can be threaded up within the plow into position shown in Fig. 4 in which position it does not touch the ground and allows the plow to clean or remove the snow by the body of the plow dragging along the surface of the ground. The roller 42 is also employed for guiding the plow when utilizing the same on light snow or in transporting it from place to place, and the direction of the plow is controlled by swinging the roller by means of the crank 44 as is obvious and will of course be readily understood.

Having thus fully described my invention what I claim as new and desire to secure by Letters Patent of the United States is:—

1. In a snow plow a supplemental guiding point pivotally applied to the primary point and arranged distantly from the primary point, means adapted for effecting such arrangement of said supplemental point with respect to said primary point, and for moving said supplemental point with respect to the primary point.

2. In a snow-plow, a supplemental guiding point having rearwardly projecting lugs receiving between them a lug or projection of the plow, said guiding point having a rearwardly extending arm or lever, and a pin extending through said arm or lever, through said lugs and through an additional lug of the plow.

3. A snow-plow including a supplemental guiding point having rearwardly extending lugs and a rearwardly extending arm or lever, said plow having forwardly projecting lugs, one being received between the first referred to lugs, a pin extending through said arm or lever and through said lugs, and an additional pin insertible through said lever or arm and into the plow.

4. A snow-plow comprising a point-carrying member having a rearwardly extending team-receiving frame provided with a forward transverse bar and a rear transverse bar and longitudinal draft-attaching bars, means effecting connection between said longitudinal and transverse bars, the rear transverse bar being received in depressions in the rear edges of the lateral frame members, and means effecting the retention of said transverse bar in said depressions.

5. A snow-plow comprising a plow-point member having a rearwardly extending frame, the lower edge of its lateral portions resting upon the surface, said lateral portion having offset members at their rear ends provided with depressions, a transverse rear end bar received within said depressions, and means for the retention of said transverse bar in effective position therein.

In testimony whereof, I affix my signature, in presence of two witnesses.

JOHN SPAHN.

Witnesses:
 HUGO PAFF,
 RAPHAEL PFISTERER.